(12) United States Patent
Templeton et al.

(10) Patent No.: US 7,644,779 B1
(45) Date of Patent: Jan. 12, 2010

(54) WALK-BEHIND IMPLEMENT WITH COUNTER-ROTATING ATTACHMENT

(75) Inventors: David J. Templeton, New Holland, PA (US); Kenneth R. Underhill, Strasburg, PA (US)

(73) Assignee: Turf Teq, LLC, Honey Brook, PA (US)

( * ) Notice: Subject to any disclaimer, the term of this patent is extended or adjusted under 35 U.S.C. 154(b) by 634 days.

(21) Appl. No.: 11/194,310

(22) Filed: Aug. 1, 2005

Related U.S. Application Data

(63) Continuation-in-part of application No. 10/120,747, filed on Apr. 11, 2002, now Pat. No. 6,938,699.

(60) Provisional application No. 60/283,163, filed on Apr. 12, 2001.

(51) Int. Cl.
*A01B 33/00* (2006.01)
(52) U.S. Cl. .................. 172/42; 172/14; 56/2; 15/79.2
(58) Field of Classification Search .................. 56/2, 56/17.5, DIG. 9; 172/12–16, 40–42; 15/79.2
See application file for complete search history.

(56) References Cited

U.S. PATENT DOCUMENTS

| | | | | | |
|---|---|---|---|---|---|
| 2,613,582 A | * | 10/1952 | Harshberger | .................. | 172/40 |
| 2,669,826 A | * | 2/1954 | Watrous | ...................... | 56/13.4 |
| 2,765,483 A | * | 10/1956 | Le Blanc | ...................... | 15/79.2 |
| 2,787,107 A | * | 4/1957 | Strasel | ........................ | 56/16.9 |
| 2,913,058 A | * | 11/1959 | Smith et al. | .................... | 172/15 |
| 3,537,244 A | * | 11/1970 | Hicks | .......................... | 56/17.1 |
| 3,603,162 A | * | 9/1971 | Gohler | ........................... | 74/16 |
| 4,077,731 A | * | 3/1978 | Holz et al. | ..................... | 404/83 |
| 4,674,143 A | * | 6/1987 | Agergard et al. | ............. | 15/79.2 |
| 4,703,613 A | * | 11/1987 | Raymond | ................... | 56/12.7 |
| 4,802,536 A | * | 2/1989 | O'Neal | ......................... | 172/42 |
| 5,054,151 A | * | 10/1991 | Estes, Sr. | ...................... | 15/79.2 |
| 5,426,805 A | * | 6/1995 | Fisher | ........................ | 15/79.2 |
| 5,862,655 A | * | 1/1999 | Altamirano et al. | .......... | 56/12.1 |
| 6,256,970 B1 | * | 7/2001 | Fleener | ........................ | 56/12.7 |

\* cited by examiner

*Primary Examiner*—Alicia M Torres
(74) *Attorney, Agent, or Firm*—Miller Law Group, PLLC

(57) ABSTRACT

A walk-behind power unit is configured to detachably mount a counter-rotating powered drum work implement on a centrally pivoted implement carrier. The pivoting of the implement carrier from a central position to either side causes the discharge of the powered drum to be located on a desired side of the work implement. The work implement can also be positioned to discharge forwardly from the powered drum member. A lift apparatus is provided to be cooperable with an associated set of support wheels to affect the positioning of the powered drum member between a lowered operative position and a raised transport position. The powered, counter-rotating drum member can be either a rotatable broom or a power rake. In the broom configuration, the lift apparatus can move the lid member, after first unlatching the lid member from the frame of the work implement, to fix the lid in an opened position.

15 Claims, 10 Drawing Sheets

WALK-BEHIND IMPLEMENT WITH COUNTER-ROTATING ATTACHMENT

CROSS-REFERENCE TO RELATED APPLICATIONS

This application is a continuation-in-part of U.S. patent application Ser. No. 10/120,747, filed Apr. 1, 2002, now U.S. Pat. No. 6,938,699 which claims domestic priority on U.S. Provisional Patent Application Ser. No. 60/283,163, filed Apr. 12, 2001, the contents of both identified patent applications being incorporated herein by reference.

FIELD OF THE INVENTION

This invention relates generally to a powered utility apparatus and, more particularly, to a walk-behind power unit having a counter-rotating attachment that is centrally pivotally mounted to permit orientation thereof in different directions.

BACKGROUND OF THE INVENTION

Powered walk behind or self-propelled tools are known in the art. Examples include brush mowers, lawn mowers, rotary brooms, string trimmers and edging mechanisms. Each such implement is operably driven by a dedicated power unit. It would be desirable to have the capability of utilizing a single such power unit for which different powered implements could be attached to perform the function desired. Such a power unit configuration would be more cost effective as the operator would be required to purchase only a single power unit that could be adapted for operative connection to a variety of implement attachments.

Counter-rotating brooms and power rakes are implements typically mounted on self-propelled vehicles, such as skid steer loaders and tractors, to perform the desired function. Power rakes are used to help prepare soil for the planting of lawns. By rotating the rotatably driven toothed drum through the top surface of the soil, the toothed drum serves as a power driven rake that combs stones and debris from the upper surface of the soil to provide a smooth surface for the planting of grass. Rotary brooms are also conventionally mounted on tractors and larger self-propelled vehicles to clean the surface of a paved area, such as a parking lot.

The mounting of a counter-rotating broom or power rake to a walk-behind power unit would provide substantial flexibility for using the implement in smaller areas, such as using the broom on sidewalks and placing the power rake into operation in tight areas where little maneuverability is possible. Furthermore, by mounting the power driven implement on a centrally pivoted carrier apparatus, extended flexibility in operation of the implement can be obtained.

SUMMARY OF THE INVENTION

It is an object of this invention to overcome the disadvantages of the prior art by providing a walk-behind power unit to which a counter-rotating implement can be operably mounted to permit operation of the implement in small areas.

It is another object of this invention to provide a centrally pivoted implement mounting mechanism for a counter-rotating implement to permit the implement to be laterally shifted while being operated.

It is another feature of this invention that the implement mounting mechanism is pivotable about a generally vertical axis of rotation to provide the ability to angle the implement attached to the power unit laterally.

It is still another feature of this invention that the vertical axis of rotation of the implement mounting mechanism corresponds to the powered output shaft of the engine forming a part of the walk-behind power unit.

It is another advantage of this invention that the pivotable implement mounting mechanism allows the attached implement to be operated in different configurations.

It is still another feature of this invention that the implement mounting mechanism is pivotable to both the left and right of a longitudinally extending axis, corresponding to the normal direction of travel of the power unit.

It is still another advantage of this invention that the operating characteristics of the attached counter-rotated, powered implement can be varied by pivotally moving the implement left or right of the normal direction of travel.

It is yet another feature of this invention that the discharge of the counter-rotated implement can be directed selectively to opposite sides of the power unit by pivoting the orientation of the work implement relative to the power unit.

It is another object of this invention to provide a powered broom implement that can be operably couple to a walk-behind power unit for operation therefrom.

It is still another object of this invention to provide a power rake work implement that can be mounted on a centrally pivoted implement carrier apparatus for operation with a walk-behind power unit.

It is still another advantage of this invention that the counter-rotated power implement can be operated in small areas with limited maneuverability for the power unit.

It is yet another feature of this invention that the angle of attack for the powered work implement can be changed selectively so that the discharge therefrom can be directed to opposing sides of the power unit.

It is yet another feature of this invention to provide a lift apparatus associated with the powered work implement to permit the counter-rotated implement to be raised vertically to allow the implement to be transported over the surface of the ground.

It is a further feature of this invention that the powered broom implement is provided with a movable lid that can be latched in an opened position to facilitate access to the broom member.

It is yet another advantage of this invention that the apparatus for moving the powered work implement between a transport position and an operative position can also be utilized to move the lid into a clean-out position.

It is still a further object of this invention to provide a counter-rotating powered drum work implement mounted on a power unit operable to power the operation of the work implement supported on a centrally pivoted implement carrier, which is durable in construction, inexpensive of manufacture, carefree of maintenance, facile in assemblage, and simple and effective in use.

These and other objects, features and advantages are accomplished according to the instant invention by providing a walk-behind power unit that is configured to detachably mount a counter-rotating powered drum work implement on a centrally pivoted implement carrier. The pivoting of the implement carrier from a central position to either side causes the discharge of the powered drum to be located on a desired side of the work implement. The work implement can also be positioned to discharge forwardly from the powered drum member. A lift apparatus is provided to be cooperable with an associated set of support wheels to affect the positioning of the powered drum member between a lowered operative position and a raised transport position. The powered, counter-rotating drum member can be either a rotatable broom or a power rake. In the broom configuration, the lift apparatus can move the lid member, after first unlatching the lid member from the frame of the work implement, to fix the lid in an opened position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
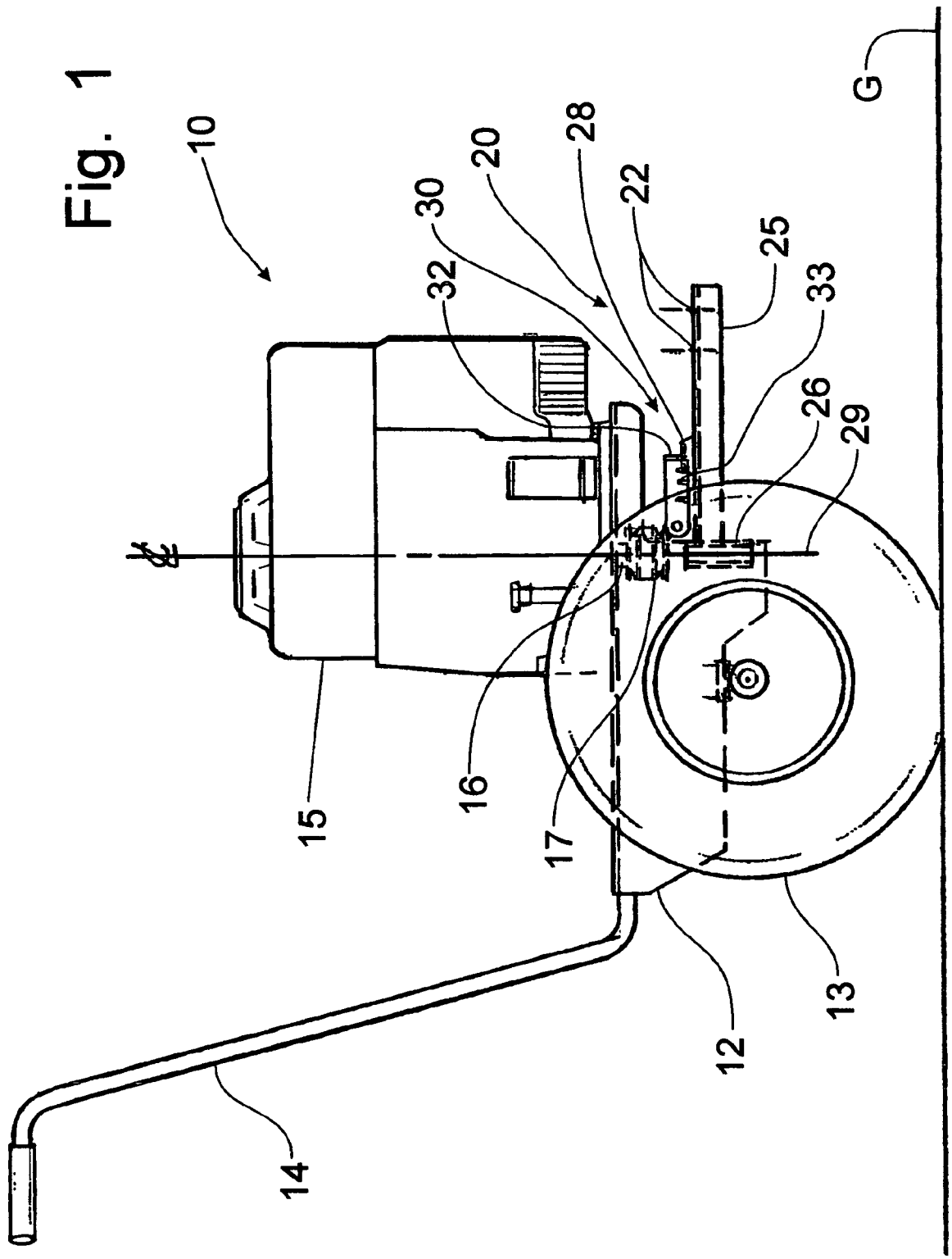
FIG. 1 is a schematic right side elevational view of a walk-behind power unit incorporating the principles of the instant invention and having a centrally pivoted implement mounting mechanism for the attachment of a work implement incorporating a counter-rotating drum member, the vertical axis concentric with the engine output shaft being identified with a schematically imposed centerline.
Figure 3:
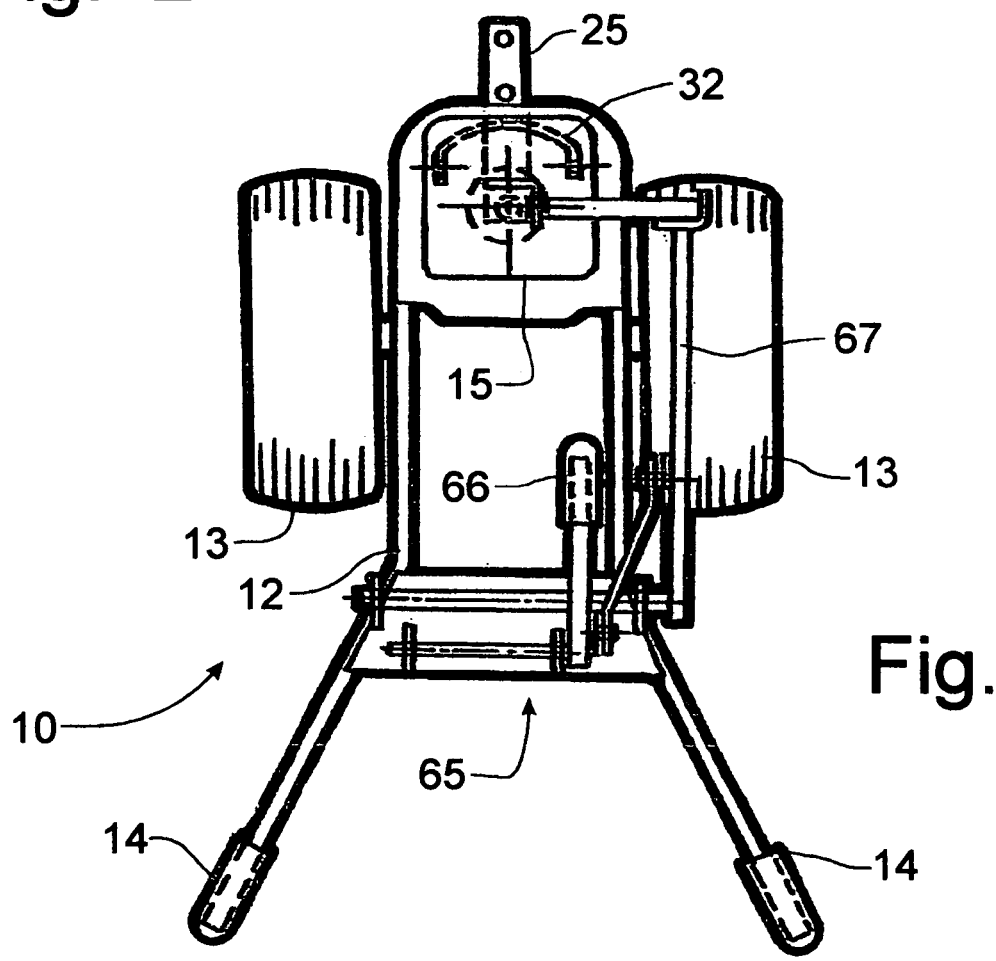
FIG. 3 is a schematic top plan view of the power unit depicted in FIG. 1, the power unit being equipped with a implement lift mechanism not shown in FIG. 1 and being positioned to receive the work implement depicted in FIG. 2.
Figure 8:
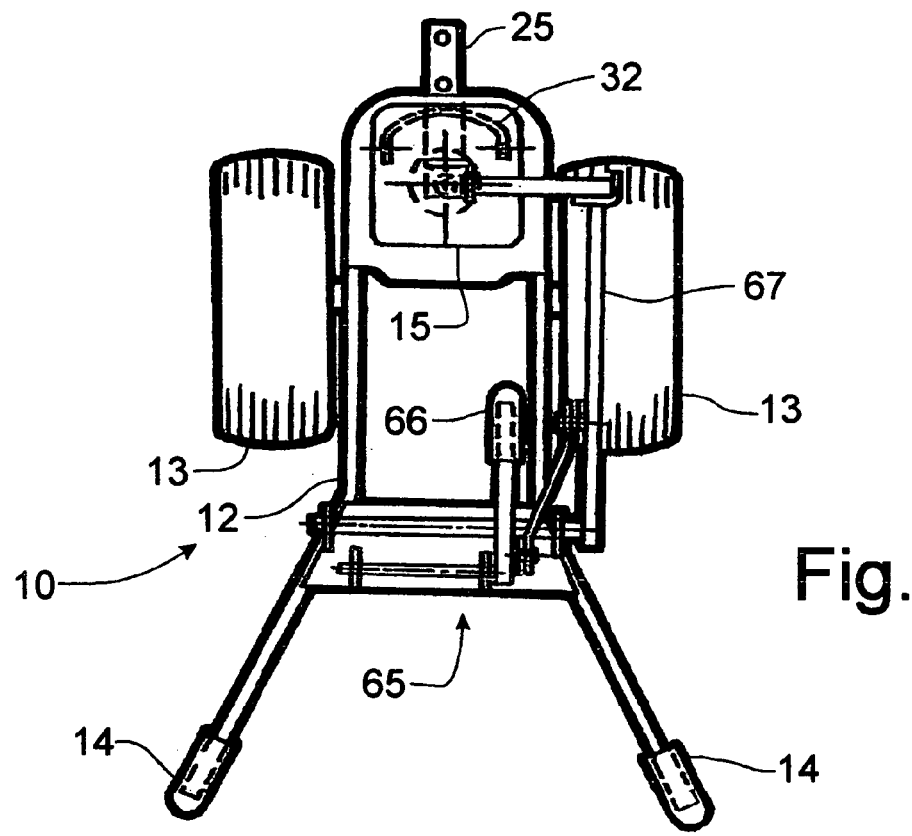
FIG. 8 is a schematic top plan view of the power unit depicted in FIG. 1, the power unit being equipped with a implement lift mechanism not shown in FIG. 1 and being positioned to receive the work implement depicted in FIG. 7.
Figure 9:
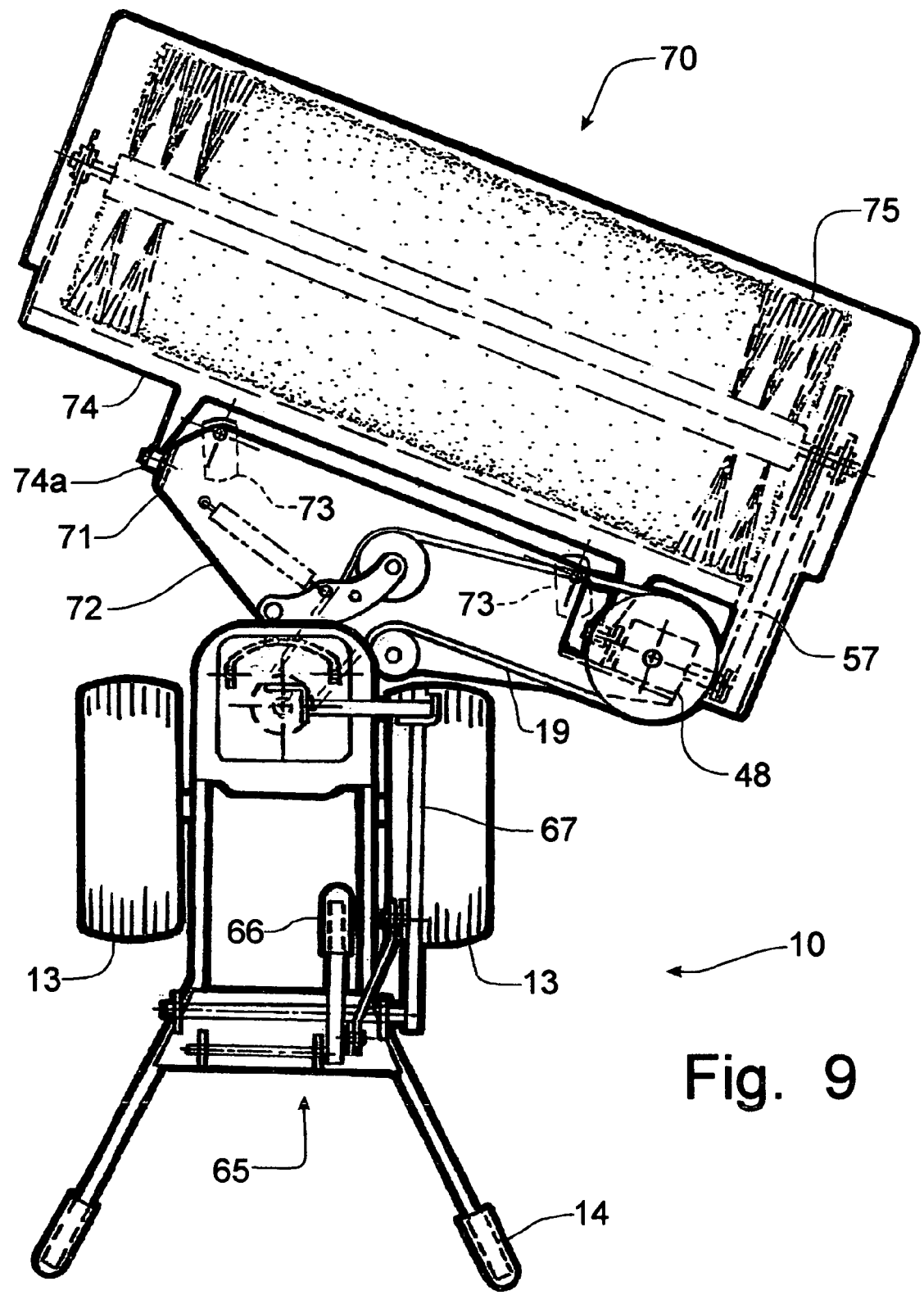
FIG. 9 is a schematic top plan view of the power unit depicted in FIG. 8 and having the rotatable broom work implement depicted in FIG. 7 mounted thereon, the rotatable broom work implement being angled for discharge to the right of the power unit.
Figure 10:
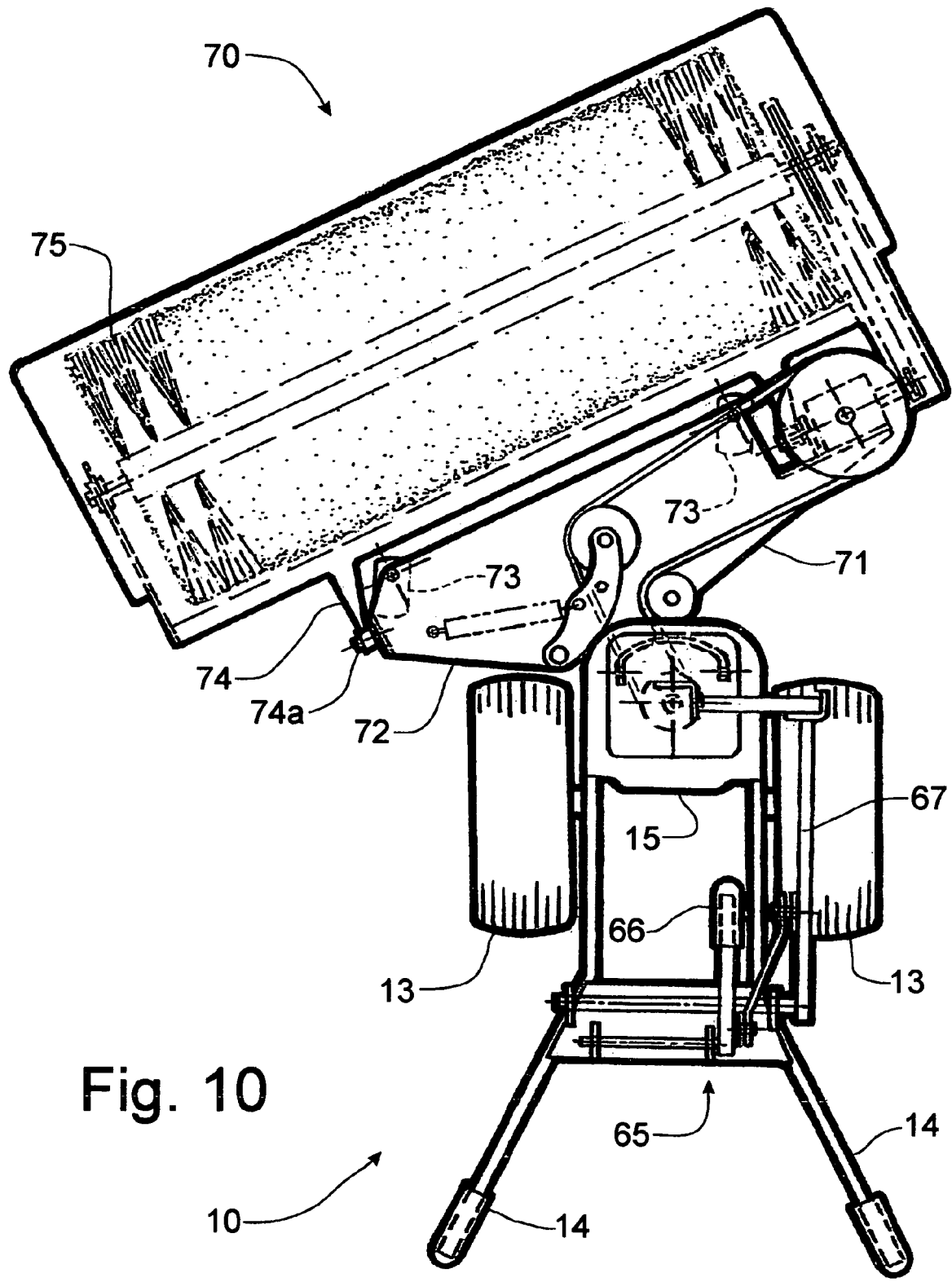
FIG. 10 is a schematic top plan view of the power unit and attached rotatable broom work implement as depicted in FIG. 7 but with the implement mounting mechanism being rotated to the left to angle the rotatable broom work implement for discharge to the left of the power unit.

Referring now to FIGS. 1, 3 and 8, a walk-behind version of a power unit incorporating the principles of the instant invention can best be seen. Any left or right references are used as a matter of convenience and are determined by standing at the rear of the machine where the operator would walk gripping the handlebars to effect movement of the power unit in a forward direction.

A walk-behind power unit 10 is known in the art in the form of brush mowers, edging attachments, grass mowers, tillers and other similar equipment. Walk-behind power units 10 typically have a frame 12 supported above the ground G by a pair of wheels 13 and an integral implement 40. An engine 15 providing the operative power of the unit 10 is supported on the frame 12. The engine 15 has a rotatable power output shaft 16 on which is typically mounted a drive pulley 17 operable to drive the rotation of a drive belt 19 operably interconnecting the integral implement 40 to transfer rotational power thereto. The frame 12 extends rearwardly and upwardly to form a pair of laterally spaced handlebars 14 which the operator can grasp to control the operation and direction of travel of the unit 10. Typically, the handlebars 14 will have controls (not shown) supported thereon to control various aspects of the engine 15.

FIGS. 1, 3 and 8 depict the power unit 10 without an implement 40 attached thereto. Since the two wheels 13 provide only two points of contact with the ground, the implement 40 when attached to the implement mounting mechanism 20 or otherwise connected to the frame 12 will provide a third point of contact and, thereby, provide positional stability for the power unit 10. FIGS. 1, 3 and 8, however, terminate with the implement mounting mechanism 20 forming the terminus of a pivoted support arm 25 that is supported by bearings 26 housed in the frame 12 of the mower 10 to permit pivotal movement about a vertical pivot axis 29 that is concentric with the generally vertically oriented power output shaft 16. The support arm 25 is provided with appropriate attachment devices, such as bolt holes 22 and corresponding fasteners, or clamping devices (not shown) to connect a work implement 40 correspondingly fitted to attach to the implement mounting mechanism 20 and be carried by and powered by the power unit 20. The pivotal movement of the support arm 25 about the vertical pivot axis 29 will enable the work implement 40 to be oriented in a variety of positions relative to the power unit 10, as will be described in greater detail below.

One skilled in the art will readily recognize that the implement mounting mechanism 20 can be formed in a variety of configurations. The configuration depicted in the drawings is of a hollow support arm 25 fitted to receive a corresponding mounting arm (not shown) or a fixture 42 or the like forming a part of the frame 41 of the work implement 40. A pair of attachment bolts can pass through holes 22, 42a formed in the respective support arm 25 and the mounting fixture 42 to attach the work implement 40 to the power unit 10.

As best seen in FIG. 1, a locking mechanism 30 is supported by the frame 12 to be engageable with the support arm 25 to control the pivotal movement thereof about the pivot axis 29. While the locking mechanism 30 may take one of many similar forms, the preferred embodiment of the locking mechanism 30 includes a semi-circular bracket 32 having a plurality of teeth 33 formed therein. A key 28 is formed in the top of the support arm 25 to be integral therewith and be movable beneath the bracket 32 as the support arm 25 is pivoted about the pivot axis 29. The bracket 32 has as many teeth 33 or slots formed therein as pivoted positions are desired. Preferably at least five teeth 33 are formed to define a central, straight forward position and at least two different angular positions to both the left and right sides of the central position.

The locking mechanism 30 is preferably spring-loaded into a lowered pivoted position in engagement with the key 28 by a spring (not shown) interconnecting the bracket 32 and the frame 12. To effect pivotal movement of the support arm 25, the semi-circular bracket 32 must first be raised to disengage the support arm key 28. While this operation would preferably be manual in nature, remote actuation is possible, as is an interlock mechanism (not shown) that could be associated with the raising of the bracket 32 to prevent a powered operation of the attached implement 10 when the bracket is raised.

The preferred embodiment of the control mechanism (not shown) for controlling the pivoting of the bracket 32 would be a conventional cable mounted on the handle bars 14 for a convenient operation by the operator and connected to the bracket 32 to force movement thereof against the force exerted by the spring (not shown). An interlock mechanism is not preferred as the operation of the work implement 40 as the implement 40 is moved from side to side is preferred in some.

Referring now to FIGS. 2-6, the attachable work implement 40 can be formed as a power rake implement 50 operably powered through a drive belt 19 entrained around a driven pulley 43, first and second idler pulleys 44, 45, and the drive pulley 17 affixed to said power output shaft 16. One of the idler pulleys 45 is preferably pivotally mounted on a conventional mounting arm 46 which is biased by a spring 47 into engagement with the drive belt 19 to maintain proper driving tension therein during operation. The driven pulley 43 is mounted on a 90 degree gearbox 48 to transfers rotational power from the power unit 10 to the implement 40.

The power rake work implement 50 is formed with an exterior frame 51 that rotatably mounts a counter-rotating drum-like implement 55 in the form of a hollow drum 55 having a plurality of blades 56 welded thereto in a spiral pattern and projecting radially therefrom. The drum 55 operates to prepare the surface of the ground for planting grass, substantially as shown and described in U.S. Pat. No. 5,070, 946, issued to John L. Herr, et al on Dec. 10, 1991, the description of which is incorporated herein by reference. The drum 55 is rotatably driven through a drive belt 57 entrained around the output pulley 49 on the gearbox 48 to rotate counter to the direction of travel such that the front of the drum 55 moves upwardly, as reflected in the arrow 58 in FIG. 6. As a result, any stones or debris raked from the top surface of the soil by the spirally mounted blades 56 are moved forwardly of the drum 55.

Figure 2:
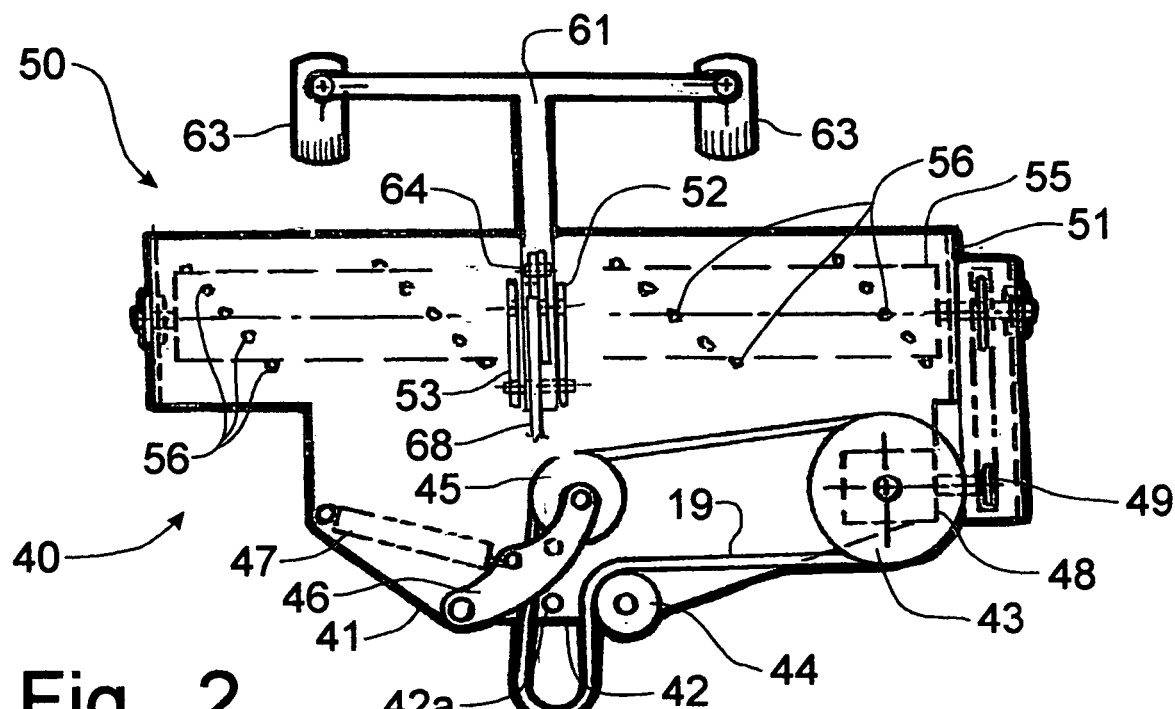
FIG. 2 is a schematic top plan view of the power rake work implement having a counter-rotating drum member in the form of a power rake.
Figure 4:
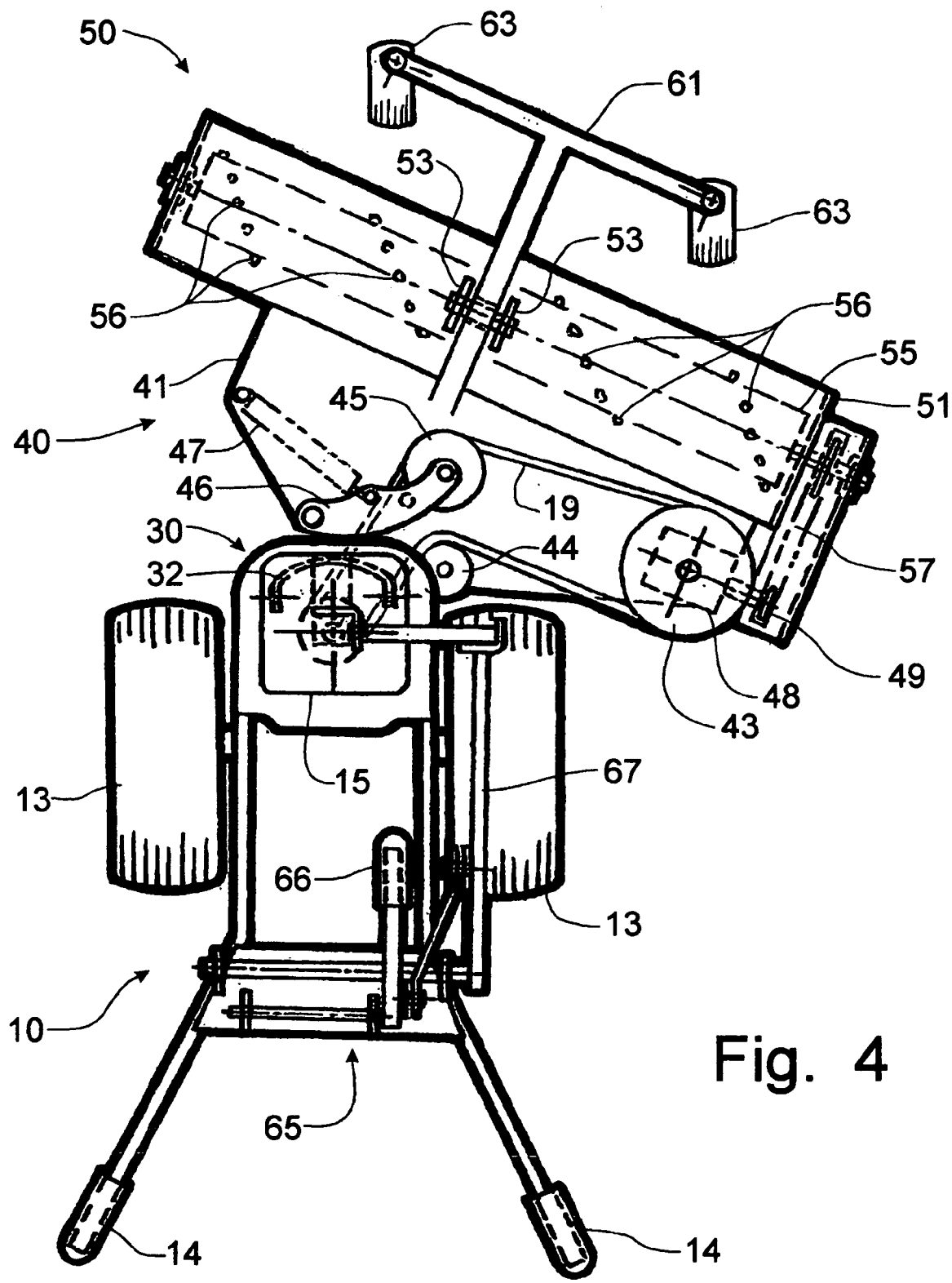
FIG. 4 is a schematic top plan view of the power unit depicted in FIGS. 1 and 3 and having the work implement depicted in FIG. 2 mounted thereon, the power rake work implement being angled for discharge to the right of the power unit.
Figure 5:
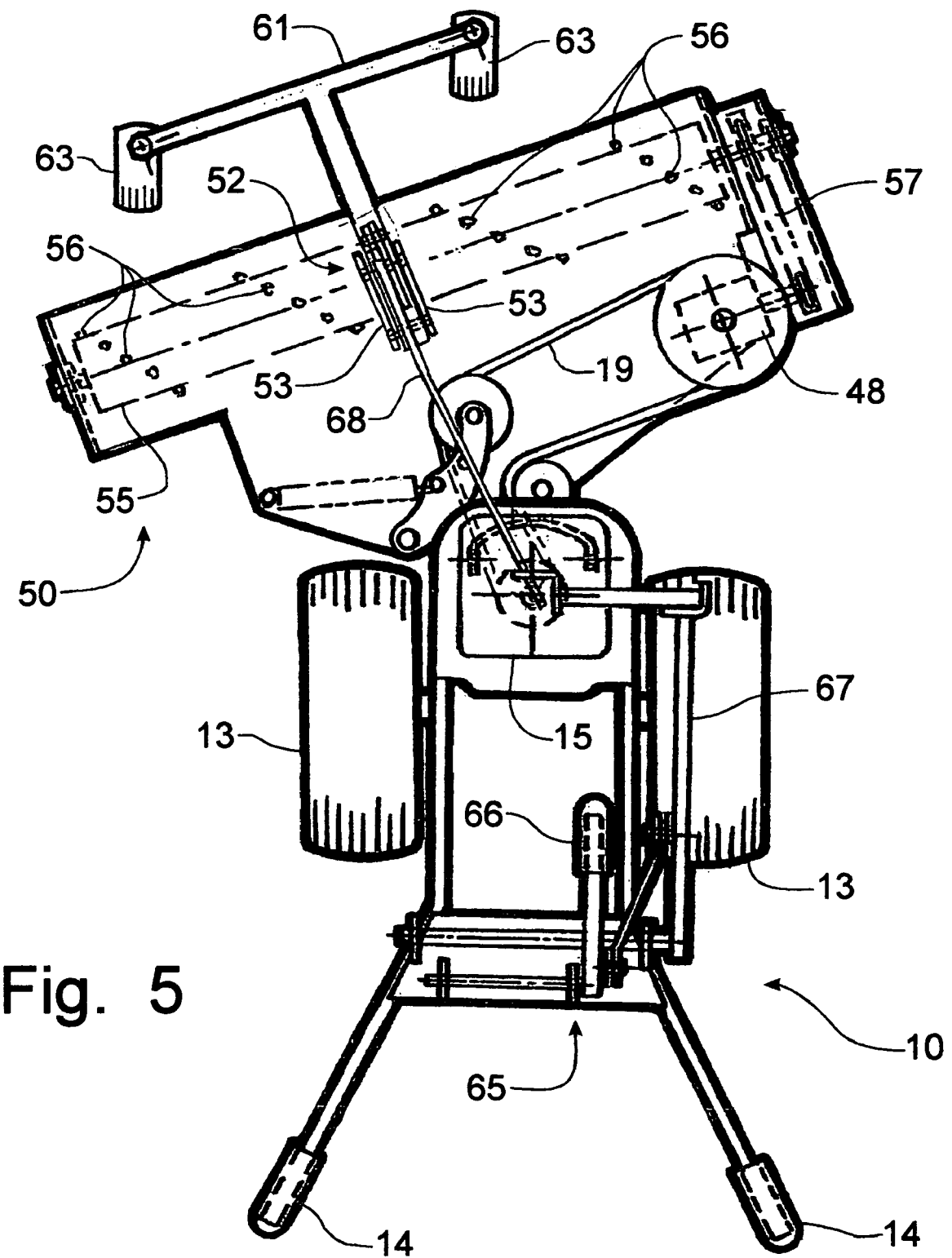
FIG. 5 is a schematic top plan view of the power unit and attached power rake work implement as depicted in FIG. 4 but with the implement mounting mechanism being rotated to the left to angle the power rake work implement for discharge to the left of the power unit.

The mounting of the power rake implement 50 on the centrally pivoted support arm 25 for pivotal movement about the vertical axis corresponding to the output shaft 16 of the engine 15 allows the implement 50 to be angled to the right, as is depicted in FIG. 4, to the left, as is depicted in FIG. 5, or to be oriented perpendicular to the direction of travel, as is indicated in FIG. 2. When the implement 50 is angled to the right or the left, the stones and other debris raked from the top surface of the soil by the rotating drum 55 are conveyed to the edge of the drum and deposited in a row oriented generally parallel to the direction of travel. Re-positioning the implement 50 to be angled the opposite direction will discharge the stones and debris to the opposite side of the drum 55 and enable the discharged stream to be combined with the previously deposited row of debris. The positioning of the drum 55 perpendicular to the direction of travel will accumulate the debris at the forward edge of the drum 55, as least for a limited time until the accumulated debris becomes too large, where the debris cannot be discharge to the left or the right sides of the drum 55.

The ability to re-position the angle of attack of the drum 55 enables the power rake implement 50 to be utilized in small areas in which maneuverability is limited and machines, such as the tractor mounted apparatus depicted in the aforementioned U.S. Pat. No. 5,070,946, cannot be operated effectively. Furthermore, the walk-behind nature of the power unit 10 provides for flexibility in use of the power rake implement 50 where the much larger tractors and skid steer loaders cannot traverse.

Figure 6:
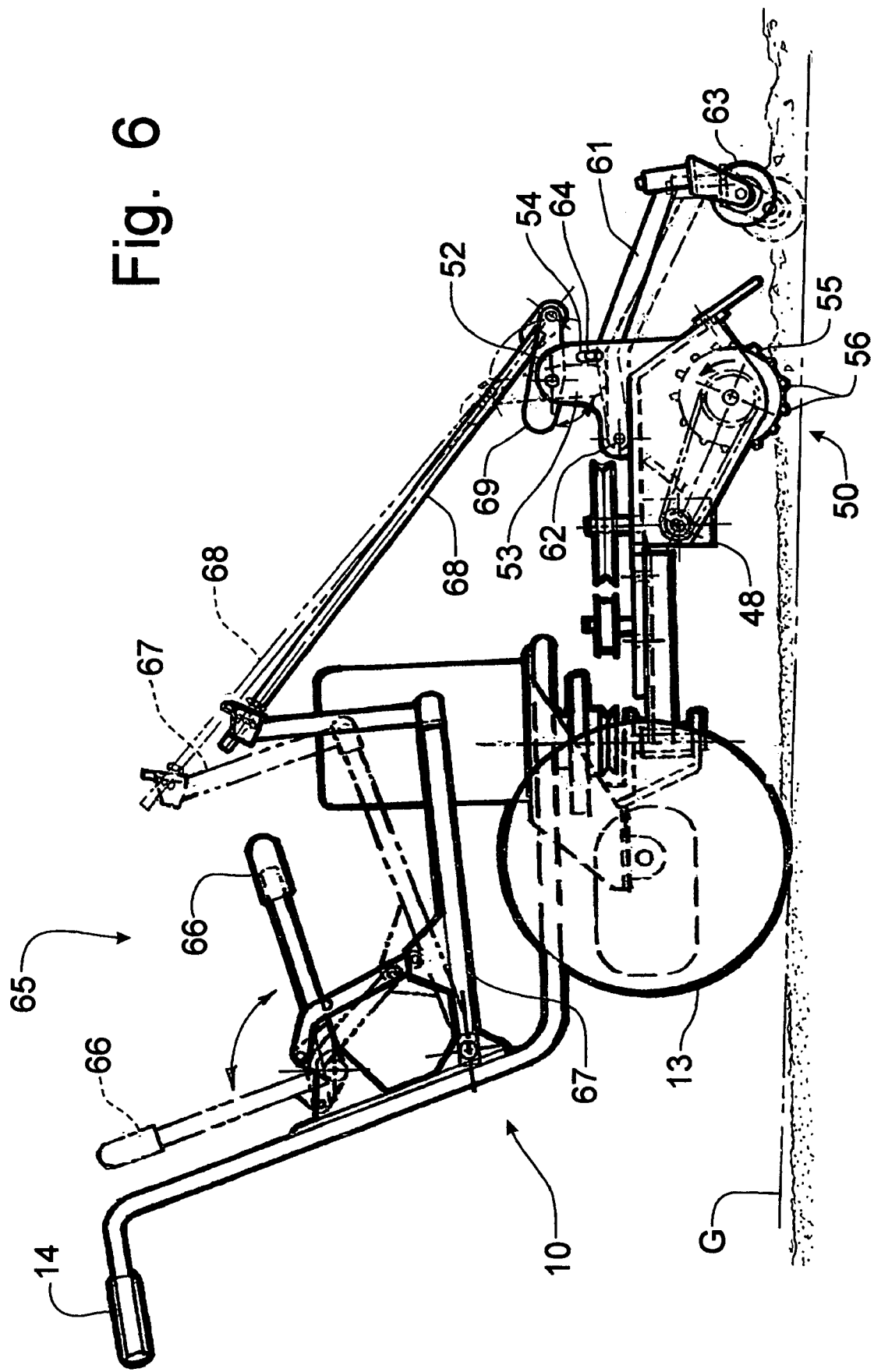
FIG. 6 is a schematic elevational view of the power unit and attached power rake work implement, the movement of the implement lift mechanism being depicted in phantom.
Figure 7:
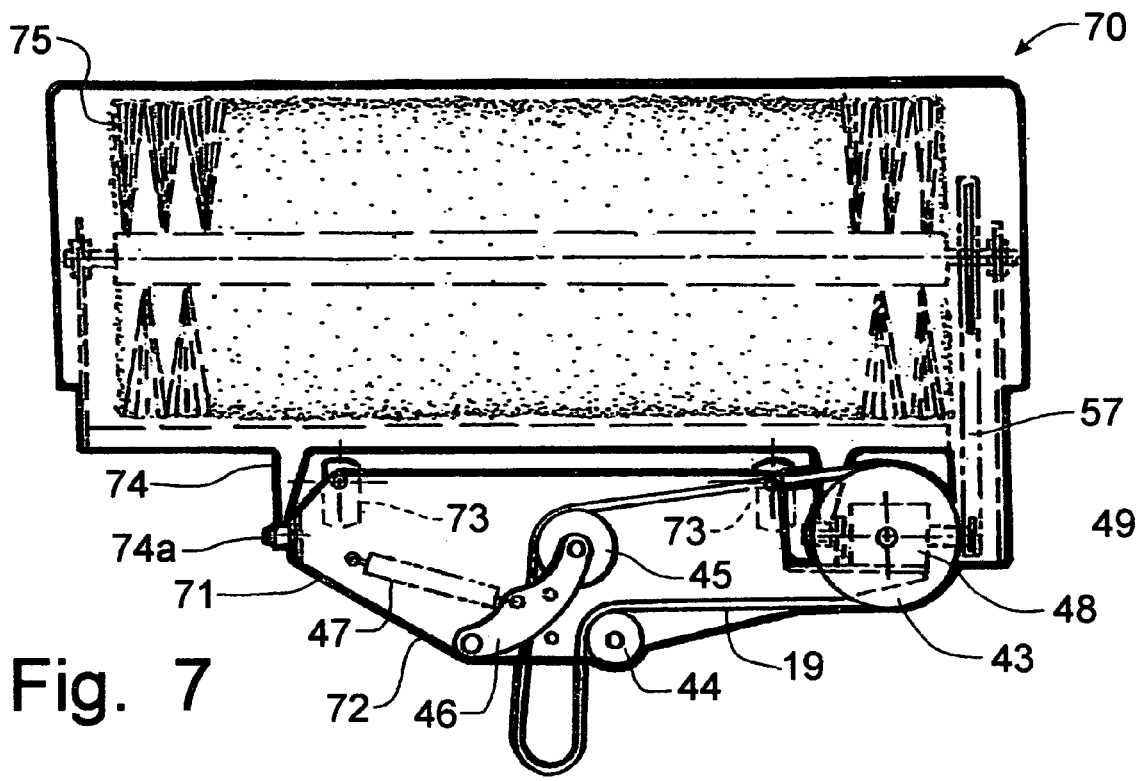
FIG. 7 is a schematic top plan view of the rotatable broom work implement having a counter-rotating drum member in the form of a cylindrical brush.

As best seen in FIGS. 5 and 6, the frame 51 of the power rake implement 50 is provided with a pair of dolly wheels 63 mounted for castering forwardly of the drum 55 by a T-shaped outrigger boom 61 to form part of a implement lift mechanism 60. The positioning of the dolly wheels 63 forwardly of the drum 55 provides operative depth control for the operation of the drum 55 such that the drum 55 will fill small valleys and level small hills in the preparation of the ground for the planting of grass. The outrigger boom 61 is pivotally connected to the frame 51 by a pivot 62 to orient the outrigger boom 61 between a pair of upright members 53 forming a support tower 52 projecting above the frame 51 of the implement 50. The upright members 53 are formed with opposing slotted openings 54 therein and positioned to receive a lift pin 64 that is affixed to the outrigger boom 61. The lift pin 64 riding within the limits imposed by the slotted openings 54 to define the range of movement afforded to the outrigger boom 61 relative to the frame 52.

The weight of the power rake implement 50 keeps the lift pin 64 positioned at the top of the slotted openings 54, thus lowering the drum 55 into the surface of the ground G into an operative position. The dolly wheels 63 providing riding on the surface of the ground, coupled with the motion limits imposed by the lift pin 64 on the frame 52, define the depth control for the drum 55. To raise the drum 55 into a transport position, depicted in phantom in FIG. 6, the lift mechanism 65 is actuated to change the pivoted position of the outrigger boom 61 relative to the frame 52. The lift mechanism 65 is formed of a lift lever 66 operatively connected to a lift linkage 67 that is, in turn, attached to a connecting rod 68 that is permitted to swivel from left to right in conjunction with the corresponding movement of the power rake implement 50. The connection point between the connecting rod 68 and the connecting linkage 67 is in substantial vertical alignment with the vertical pivot axis 29 so as not to impede the movement of the implement 40 on the support arm 25 and to keep the connecting rod 68 at a substantially uniform length as the implement frame 51 is moved from side to side. The connecting rod 68 is pivotally connected to a cam lever 69 that is pivotally mounted between the upright members 53. Preferably, the lift lever 66 is supported in a manner on the frame 12 of the power unit 10 so that the lift lever 66 moves into an overcenter position when either fully forward or fully rearward.

The rearward movement of the lift lever 66, to the position depicted in phantom in FIG. 6, affects a corresponding rearward movement of the connecting rod 68, irrespective of the orientation of the power rake implement 50. The rearward movement of the connecting rod 68 causes a pivotal movement of the cam lever 69 from the generally horizontal position shown in solid lines in FIG. 6 to the generally vertical position depicted in phantom. The distal end of the cam lever 69 moves into engagement with the outrigger boom 61 forcing a downward pivotal movement of the outrigger boom 61 relative to the frame 52. Since the dolly wheels 53 remain in a weight supporting engagement with the surface of the ground G, the end result is the upward movement of the frame 52 and the drum 55 supported therein.

Referring now to FIGS. 7-12, a rotary broom implement 70 can best be seen. The drum-like implement is configured in the form of a cylindrical brush 75 that is rotatably mounted in the frame 71 of the implement 70. The frame 71 is configured similarly to the frame 51 of the power rake implement 50 in that a mounting fixture 42 is positioned to be mounted on the support arm 25 for pivotally mounting the implement 70 on the power unit 10 for angularly positioning the broom member 75 between a right angular position depicted in FIG. 9 and a left angular position depicted in FIG. 10. As with the power rake implement 50, the rotary broom implement 70 is configured such that the cylindrical broom member 75 is counter-rotated relative to the direction of travel so that the debris collected thereby is moved forwardly of the brush 75 and along the angled line of the cylindrical broom 75 for discharge from the edge thereof.

The angular positioning of the rotary broom implement 70 enables the debris swept up by the rotating cylindrical brush 75 to be discharged selectively to either the left or the right, or swept directly forwardly when the cylindrical broom member 75 is oriented perpendicular to the direction of travel. The drive mechanism for powering the rotation of the cylindrical brush member 75 can be identical to that described above with a drive belt 19 entrained around a driven pulley 43, first and second idler pulleys 44, 45, and the drive pulley 17 affixed to said power output shaft 16. As described above, one of the idler pulleys 45 is preferably pivotally mounted on a conventional mounting arm 46 which is biased by a spring 47 into engagement with the drive belt 19 to maintain proper driving tension therein during operation. The driven pulley 43 is mounted on a 90 degree gearbox 48 to transfers rotational power from the power unit 10 to the implement 70.

The frame 71 includes a fixed portion 72 on which the dolly wheels 73 are mounted to provide support and positional control of the cylindrical brush member 75. The frame 71 is also formed with a movable portion 74 on which the cylindrical brush member 75 is rotatably mounted. The movable portion 74 of the frame 71 is pivotally connected to the fixed portion 72 by a pivot 74a such that the movable portion 74 is generally vertically movable about the pivot 74a. The pivot 74a is carried by the fixed portion 72 of the frame 71 in alignment with the output pulley 49 on the gearbox 48 so that the drive through the drive belt delivering rotational power to the rotatably mounted brush member 75 is not interrupted while being raised vertically.

Figure 11:
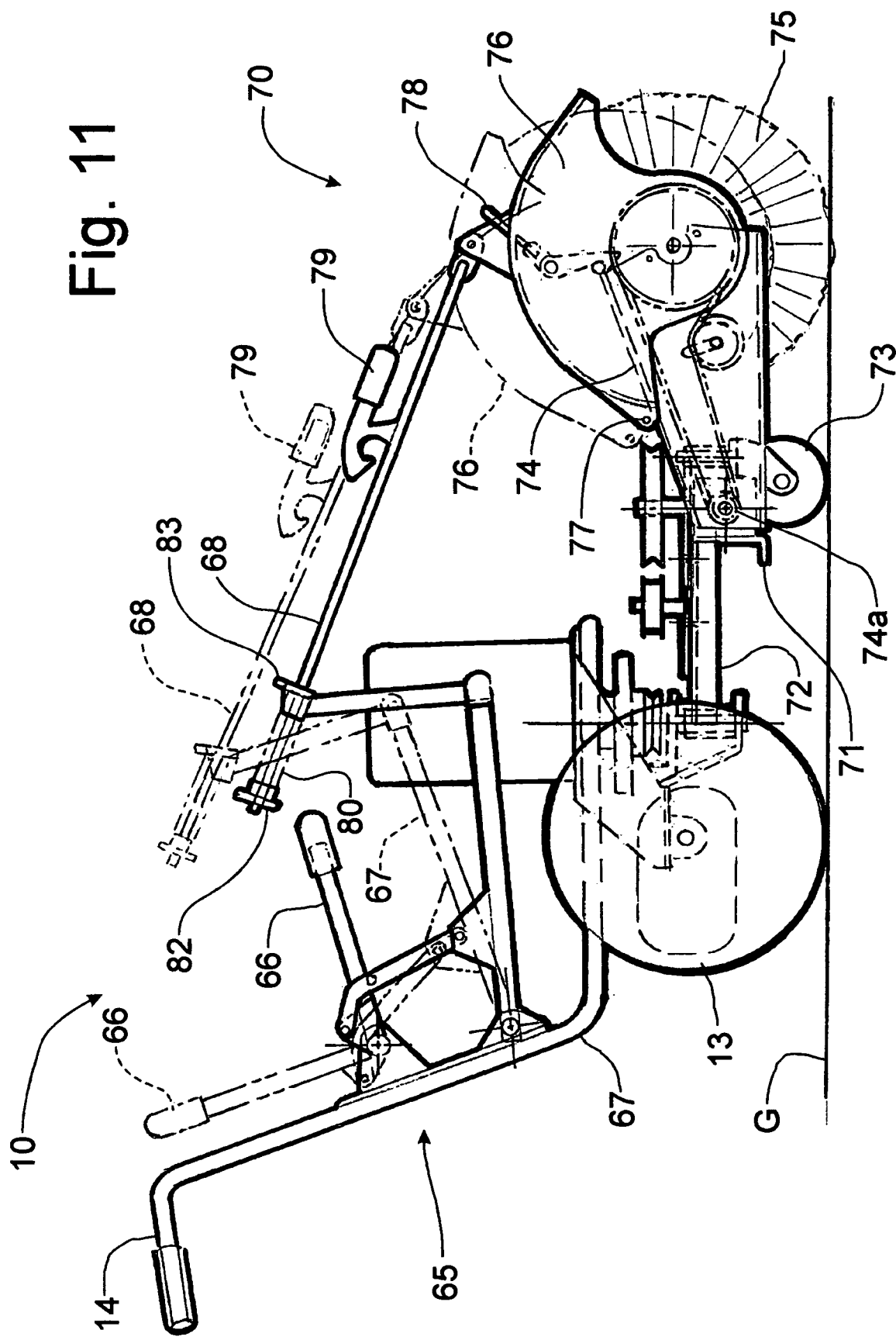
FIG. 11 is a schematic elevational view of the power unit and attached rotatable broom work implement, the movement of the implement lift mechanism being depicted in phantom.
Figure 12:
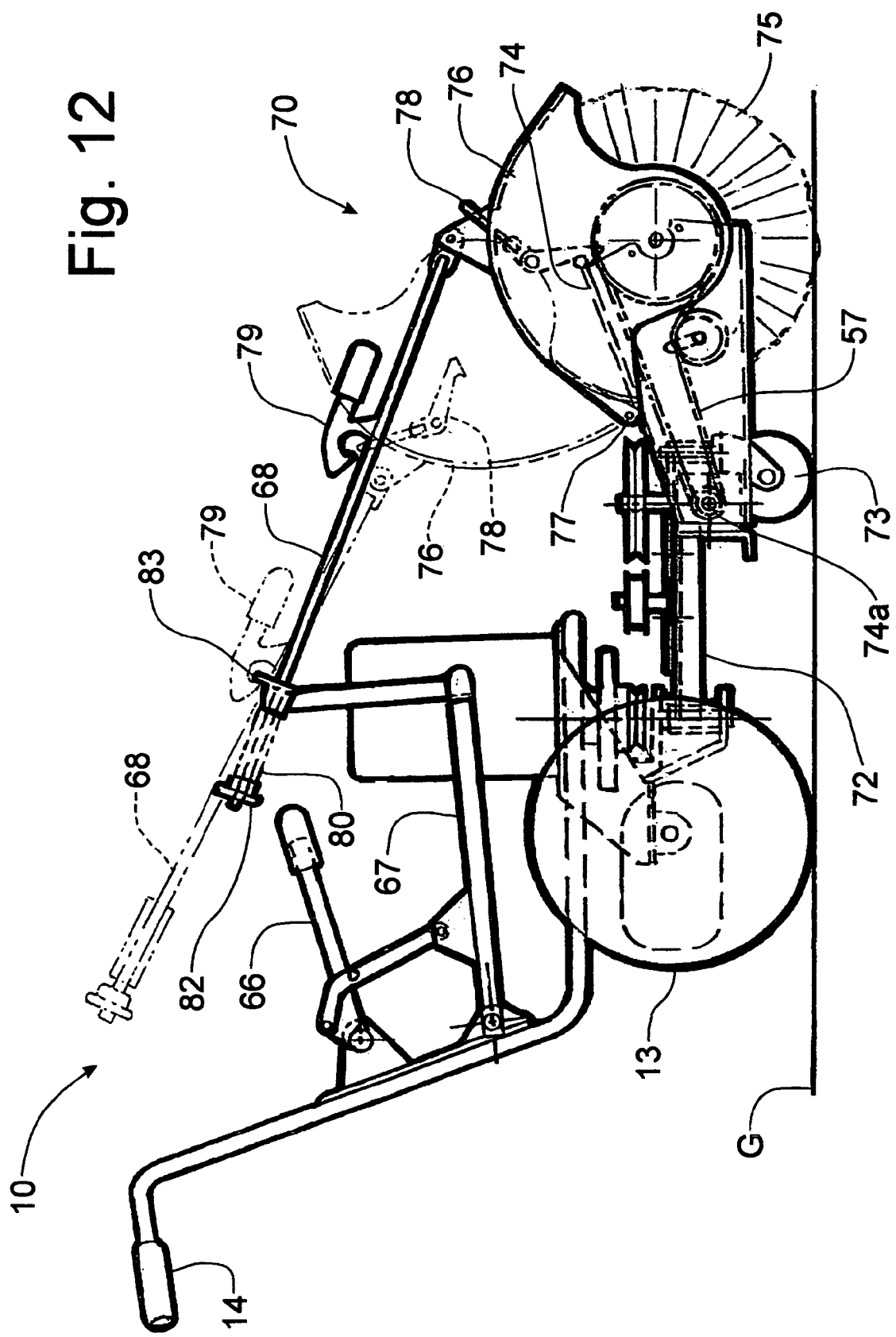
FIG. 12 is a schematic elevational view of the power unit and attached rotatable broom work implement, the movement of the implement lift mechanism to move the unlatched lid member into an opened position being depicted in phantom.

A lift mechanism 65, including a lift lever 66 operatively connected to a lift linkage 67 which, in turn, is attached to a connecting rod 68 that is permitted to swivel from left to right about a connection point that is in substantial alignment with the vertical axis corresponding to the engine output shaft 16, which movement is in conjunction with the corresponding movement of the rotary broom implement 70. The connecting rod 68, however, is pivotally connected to lid member 76 pivotally mounted to the movable portion 74 of the frame 71. The lid member 76, as is best seen in FIGS. 11 and 12, is selectively latchable to the movable portion 74 of the frame 71 by a spring-loaded latching mechanism 78. Pivoting the lift lever 66 rearwardly to draw the connecting rod rearwardly while the lid member 74 is latched to the frame 72 allows the frame 72 to pivot about the pivot 74a and affect a generally vertical movement of the cylindrical brush member 75. Thus, the lift linkage 65 is operable to move the brush member 75 between a lowered operative position, shown in solid lines in FIG. 11, and a raised transport position, depicted in phantom lines in FIG. 11.

As is best seen in FIG. 12, the connecting rod 68 is independently rearwardly slidable relative to the connecting linkage 67. By unlatching the lid member 76 from the movable portion 74 of the frame 71, the connecting rod 68 can be moved rearwardly to pivot the lid member 76 about its pivot 77 and move the lid member 76 to an opened position for accessing the cylindrical brush member 75 while in the operating position, which allows the brush member 75 to be cleaned or cleared of debris, and serviced as needed. The connecting rod 68 carries a hook member 79 that is operable to engage the connecting linkage 67 when the connecting rod 68 has been moved sufficiently to fully open the lid member 76.

The connecting rod 68 is also provided with a compression spring 80 captured by a nut 82 threaded on the end of the connecting rod 68. The compression spring 80 rests against the swivel plate 83 forming part of the connecting linkage, which is substantially in alignment with the vertical axis passing through the engine output shaft 16. The compression spring 80 provides a flotational loading for the rotary brush 75 through the connecting rod 68. The positioning of the nut 82 on the connecting rod 68 defines the spring force exerted by the compression spring 80 on the nut 82 to pull the connecting rod 68 through the swivel plate 83. The greater the spring force exerted by the spring 80, the lighter the flotation load will be on the cylindrical brush 75 and the less aggressively the brush 75 will operate against the ground surface G (or the surface against which the brush 75 is operating). Even though the compression spring 80 is imposed on the connecting rod 68, the lift linkage 65 will still be operable for lifting the movable frame 74 into a transport position, and for moving the lid member 76 into an open position, as is described above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A powered work apparatus comprising:
   a walk-behind power unit including:
   a power unit frame supported for movement over the ground by a pair of wheels, said frame forming handlebars for grasping by an operator to control a forward direction of movement of said power unit;
   an engine supported on said frame to provide a rotational power, said engine having a power output shaft extending in a generally vertical orientation and defining a substantially vertical axis;
   a support arm pivotally supported from said frame for pivotal movement about said vertical axis and extending forwardly thereof; and
   a pivot control apparatus operably associated with said support arm to control the pivotal movement of said support arm about said vertical axis;
   a work implement detachably connected to said power unit forwardly thereof, said work implement including:
   an implement frame including a mounting fixture positioned for detachable engagement with said support arm for mounting said work implement to said power unit so that said implement frame is pivotable through a generally horizontal plane about said vertical axis, said implement frame having an outrigger boom pivotally connected thereto;

at least one ground engaging caster wheel operably connected to said implement frame for support of said implement frame in cooperation with said pair of wheels on said power unit;

an elongated cylindrical work member rotatably supported on said implement frame; and a drive mechanism operably connected to said power output shaft of said engine to transfer rotational power to said cylindrical work member in a manner to rotate said cylindrical work member counter to the forward direction of movement; and a lift mechanism connected to said implement frame to move said cylindrical work member relative to said power unit frame about a generally horizontal axis between a lowered operative position and a raised transport position, said lift mechanism including a lift lever pivotally mounted on said frame of said power unit, a cam lever pivotally mounted in a support tower mounted to said implement frame, a connecting rod pivotally connected to said cam lever, and a connecting linkage interconnecting said lift lever and said connecting rod such that a rearward movement of said lift lever pulls rearwardly on said connecting rod which pivots said cam lever into engagement with said outrigger boom to force pivotal movement thereof relative to said implement frame.

2. The powered work apparatus of claim 1 wherein said cylindrical work member is a power rake comprising a drum having a plurality of blades projecting radially therefrom to comb through the surface of the ground to remove debris therefrom in preparation for planting grass on said ground surface.

3. The powered work apparatus of claim 2 wherein said at least one caster wheel is supported on said outrigger boom, said at least one caster wheel being located forwardly of said power rake, said lift mechanism being connected to said outrigger boom to cause selective pivotal movement of said outrigger boom relative to said implement frame.

4. The powered work apparatus of claim 1 wherein said connecting rod is connected to said connecting linkage at a connection point in a manner to permit movement of said connecting rod from side to side in conjunction with said work implement being moved from side to side with said support arm, said connection point being in substantial alignment with said vertical axis.

5. The powered work apparatus of claim 1 wherein said cylindrical work member is a rotary broom comprising a cylindrical brush member rotatably supported on said implement frame.

6. The powered work apparatus of claim 5 wherein said implement frame includes a fixed portion having said mounting fixture mounted on said support arm and a movable portion pivotally connected to said fixed portion, said cylindrical brush member being rotatably supported on said movable portion of said implement frame.

7. The powered work apparatus of claim 6 wherein said movable portion of said implement frame includes a lid member pivotally connected to said movable portion, and a latching mechanism interconnecting said lid member and said movable portion of said implement frame.

8. The powered work apparatus of claim 7 wherein said lift mechanism is operably connected to said lid member and is operable to pivotally move said movable portion of said implement frame when said latching mechanism connects said lid member to said movable portion of said implement frame, said lift mechanism being operable to move said lid member to an open position relative to said movable portion of said implement frame when said lid member in unlatched from said movable portion of said implement frame.

9. The powered work apparatus of claim 8 wherein said connecting rod has a compression spring mounted thereon to be cooperable with a nut to control the spring force exerted by said compression spring, said spring force offsetting a weight component of said movable portion of said implement frame to provide flotation for said cylindrical brush member.

10. A walk-behind rotary broom comprising:
a power unit frame supported for movement over the ground by a pair of wheels, said power unit frame forming handlebars for grasping by an operator to control a forward direction of movement of said power unit frame;

an engine supported on said power unit frame to provide a rotational power, said engine having a power output shaft extending in a generally vertical orientation and defining a substantially vertical axis;

a support arm pivotally supported from said power unit frame for pivotal movement about said vertical axis and extending forwardly thereof;

a pivot control apparatus operably associated with said support arm to control the pivotal movement of said support arm about said vertical axis;

an implement frame including a fixed portion having a mounting fixture positioned for detachable engagement with said support arm for mounting thereon and for permitting a selective angular positioning of said implement frame relative to said power unit frame so that said implement frame is pivotable about said vertical axis, said implement frame further including a movable portion pivotally connected to said fixed portion;

an elongated cylindrical brush member rotatably supported on said movable portion of said implement frame;

a lid member pivotally connected to said movable portion for movement relative to said brush member, said lid member includes a latching mechanism interconnecting said lid member and said movable portion of said implement frame;

a drive mechanism operably connected to said power output shaft of said engine to transfer rotational power to said cylindrical brush member in a manner to rotate said brush member counter to the forward direction of movement; and a lift mechanism operably connected to said lid member and operable to pivotally move said movable portion of said implement frame when said latching mechanism connects said lid member to said movable portion of said implement frame, said lift mechanism being operable to move said lid member to an open position relative to said movable portion of said implement frame when said lid member in unlatched from said movable portion of said implement frame.

11. The walk-behind rotary broom of claim 10 wherein said lift mechanism comprises:
a lift lever pivotally mounted on said power unit frame;
a connecting rod pivotally connected to said lid member; and
a connecting linkage interconnecting said lift lever and said connecting rod such that a rearward movement of said lift lever pulls rearwardly on said lid member, which pivotally moves said cylindrical brush member into a raised transport position when said latching mechanism latches said lid member to said movable portion of said implement frame, said connecting rod being mounted for independent rearward movement to move said lid member into an open position when said lid member is unlatched from said movable portion of said implement frame.

12. The walk-behind rotary broom of claim 11 further comprising a hook member mounted on said connecting rod for engagement with said connecting linkage when said lid member has been moved into said open position.

13. The walk-behind rotary broom of claim 11 wherein said connecting rod has a compression spring mounted thereon to be cooperable with a nut to control the spring force exerted by said compression spring, said spring force offsetting a weight component of said movable portion of said implement frame to provide flotation for said cylindrical brush member.

14. A walk-behind power rake comprising:
- a power unit frame supported for movement over the ground by a pair of wheels, said power unit frame forming handlebars for grasping by an operator to control a forward direction of movement of said power unit frame;
- an engine supported on said power unit frame to provide a rotational power, said engine having an power output shaft extending in a generally vertical orientation and defining a substantially vertical axis;
- a support arm pivotally supported from said power unit frame for pivotal movement about said vertical axis and extending forwardly thereof;
- a pivot control apparatus operably associated with said support arm to control the pivotal movement of said support arm about said vertical axis; and
- a implement frame including a mounting fixture positioned for detachable engagement with said support arm for mounting thereon and for permitting a selective angular positioning of said implement frame relative to said power unit frame so that said implement frame is pivotable about said vertical axis;
- an elongated drum having a plurality of blades affixed to a circumferential surface thereof and projecting radially outwardly therefrom, said elongated drum being rotatably supported on said implement frame;
- an outrigger boom connected to said implement frame and having at least one caster wheel mounted thereon;
- a lift mechanism operably connected to said outrigger boom to cause selective pivotal movement of said outrigger boom relative to said implement frame to move said elongated drum between a lowered operative position and a raised transport position, said lift mechanism including:
  - a lift lever pivotally mounted on said frame of said power unit frame;
  - a cam lever pivotally mounted in a support tower mounted on said implement frame;
  - a connecting rod pivotally connected to said cam lever; and
  - a connecting linkage interconnecting said lift lever and said connecting rod such that a rearward movement of said lift lever pulls rearwardly on said connecting rod which pivots said cam lever into engagement with said outrigger boom to force pivotal movement thereof relative to said implement frame; and
- a drive mechanism operably connected to said power output shaft of said engine to transfer rotational power to said cylindrical brush member in a manner to rotate said brush member counter to the forward direction of movement.

15. The walk-behind power rake of claim 14 wherein:
said at least one caster wheel is a pair of caster wheels, said outrigger boom locating said caster wheels forwardly of said elongated drum.

* * * * *